Feb. 4, 1969   M. S. KANBAR ET AL   3,425,417
REFILLABLE CRYOGENIC PROBE FOR SURGICAL USE
Filed Feb. 24, 1965
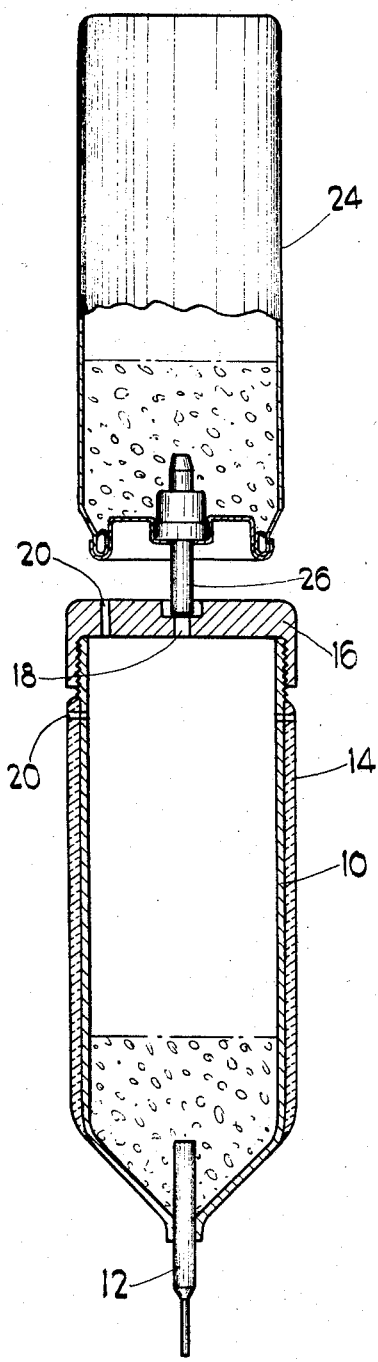
INVENTORS
M. S. KANBAR
R. D. SUDARSKY
BY Joseph H. Schofield
ATTORNEY

United States Patent Office 3,425,417
Patented Feb. 4, 1969

3,425,417
REFILLABLE CRYOGENIC PROBE FOR SURGICAL USE
Maurice S. Kanbar, 2 E. 75th St., New York, N.Y. 10021, and Raymond David Sudarsky, 422 E. 58th St., New York, N.Y. 10022
Filed Feb. 24, 1965, Ser. No. 434,969
U.S. Cl. 128—303.1
Int. Cl. A61b 17/36; F25d 3/10; A61m 19/00
2 Claims

ABSTRACT OF THE DISCLOSURE

An instrument adapted particularly for eye surgery in which the free end of a small metal probe is maintained during operation at an extremely low temperature. The base member of the instrument, from which the metal probe extends, is hollow and contains a limited amount of refrigerant in liquid form adapted to evaporate at substantially atmospheric pressure. This evaporation takes place adjacent the metal probe, the inner end of which extends within the lower end of the base member and into the pool of liquid refrigerant so that the probe will be maintained at an extremely low temperature. The base member of the instrument from time to time, and while in use, may have its supply of liquid refrigerant replenished from a supply of liquid refrigerant under pressure in a commercial refrigerant container.

To replenish the liquid refrigerant within the base member, the supply container is forced against the end of the base member opposite the metal probe to open the discharge valve in the supply container and permit liquid refrigerant from the container to flow into the space within the base member surrounding the inner portion of the probe through a filling opening provided within the base member.

---

This invention relates to instruments for clinical and surgical use, and more particularly to probes therefor in which the active end of the probe is reduced to and maintained at extremely low temperatures.

An object of primary importance of the invention is to provide an improved construction of probes of the type shown in the patent granted Maurice S. Kanbar, one of the present joint inventors, with other inventors, No. 3,259,131, granted July 5, 1966.

An object of importance of the present invention is to provide a simple form of surgical instrument having a base member forming a container for a liquid refrigerant, there being a probe extending partially from one end and providing means at its opposite end for filling the space within the base member with a limited supply of refrigerant as required during an operation.

And finally it is an object of the invention to make use of a standard commercial liquid refrigerant supply container to fill the space within the base member by mounting the supply container of any preferred type over one end of the base member, a pressure relief and discharge charge valve being provided at one end of the supply container to permit admission of the liquid refrigerant at the pressure within the supply container to the space within the base member by pressing the supply container against the opening in the end of the base member opposite the probe.

With the above and other objects in view, the invention may include the features of construction and operation set forth in the following specification and illustrated in the accompanying drawing.

In the accompanying drawing annexed hereto and forming a part of this specification, we have shown the invention embodied in a surgical instrument adapted particularly for operations on the eye and skin surfaces, but it will be understood that the invention may be otherwise embodied and that the drawing is not to be construed as defining or limiting the scope of the invention, the claims appended to this specification being relied upon for that purpose.

In the drawing:

The figure shows a form of surgical instrument adapted to be filled as required during operation directly from a commercial form of container for a liquid refrigerant such as "Freon" or other commercially available supply having the desired thermal qualities for acquiring the desired low temperatures.

In the above mentioned drawing, there has been shown but one embodiment of the invention which is now deemed preferable, but it is to be understood that changes and modifications may be made within the scope of the appended claims without departing from the spirit of the invention.

Referring more in detail to the form of cryogenic surgical instrument shown in the annexed drawing, it will be seen that the instrument base member 10 at its lower end has an elongated probe member 12 partially extending therefrom. This probe member as in the above referred to patent may be made of any high heat conductive metal such as copper, silver, or the like. The probe member 12 may be permanently secured to the base member 10 or removably attached thereto. The inner portion of the probe member 12 as shown is of increased diameter and extends well into the space within the base member 10 and within a pool of refrigerant therein when in operation. The outer cylindrical surfaces of the base member disclosed herein may preferably be provided with a heat insulating material 14. The base member 10 also is provided with a closure cap 16 at its upper end provided with a central filling hole 18. Additional openings 20 may if desired be provided in the cap 16 and body member 10 to prevent pressure being built up within the body member. Preferably and as shown, the cap 16 may be threaded to the body member 10.

To fill the base member 10, a commercial form of liquified refrigerant container 24 having a relief valve 26 at one end may be applied against the filling opening 18 of the base member 10 and the valve 26 opened by pressure of the container 24 against the base member 10. The refrigerant therefore is admitted to the space within the base member 10 in liquid form and at the pressure of the refrigerant in the supply container 24. The refrigerant within the base member 10 may be added to as re-quired during use of this form of probe so that there is maintained a small pool of refrigerant surrounding the inner end of the probe member 12.

We claim as our invention:
1. A cryogenic probe assembly for surgical use, comprising
   a hollow base member adapted to contain a limited quantity of liquid refrigerant and having
   a small metal probe mounted at one end of the base member and extending outwardly from said base member to contact the part of the body being operated on, the inner portion of the metal probe extending through the wall of said base member into the space within the base member occupied by the refrigerant, and
   said base member having a filling opening at the end opposite the metal probe, and
   a liquid refrigerant supply container having a pressure operated discharge valve at one one end adapted for temporary attachment against the filling opening end of said base member, the valve and opening being so constructed and arranged
   whereby pressure of said discharge valve against the base member will open said valve to permit liquid refrigerant to enter the space within the base member surrounding the inner end of said probe.

2. A cryogenic probe assembly for surgical use, comprising in combination
- a hollow base member adapted to contain a limited quantity of liquid refrigerant and having
- a small metal probe mounted at one end of the base member and extending partially from said end to contact the part of the body being operated on, the inner itegral portion of the probe extending within the space within the base member occupied by said refrigerant,
- said base member having a filling opening at the end opposite said metal probe, and
- a liquid refrigerant supply container having a discharge valve adapted to said filling opening and said valve being so constructed and arranged for temporary contact against said base member and admit liquid refrigerant to the space within said base member surrounding the inner portion of said probe when said supply container is forced longitudinally against said base member.

References Cited

UNITED STATES PATENTS

| | | | |
|---|---|---|---|
| 3,133,539 | 5/1964 | Eidus | 128—399 |
| 3,190,081 | 6/1965 | Pytrygg | 62—293 |
| 3,247,851 | 4/1966 | Seibert | 128—254 |
| 3,270,744 | 9/1966 | Vigtz et al. | 128—303.1 |
| 3,259,131 | 7/1966 | Kanbar et al. | 128—303.1 |
| 2,982,112 | 5/1961 | Keyes | 62—293 |
| 3,220,414 | 11/1965 | Johnston | 128—400 |
| 3,343,544 | 9/1967 | Dunn et al. | 128—303.1 |

L. W. TRAPP, *Primary Examiner.*

U.S. Cl. X.R.

62—293